(12) United States Patent
Tsuruya (10) Patent No.: US 7,276,884 B2
(45) Date of Patent: Oct. 2, 2007

(54) DC/DC CONVERTER (75) Inventor: Mamoru Tsuruya, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 11/465,270

(22) Filed: Aug. 17, 2006

(65) Prior Publication Data

US 2007/0046270 A1    Mar. 1, 2007

(30) Foreign Application Priority Data

Aug. 25, 2005   (JP)   ............................... 2005-244059

(51) Int. Cl.
  *G05F 1/253*   (2006.01)
  *G05F 1/26*    (2006.01)
  *H02M 3/335*   (2006.01)
(52) U.S. Cl. ...................... 323/261; 323/262; 363/16
(58) Field of Classification Search .................. 363/15, 363/16, 59, 60, 62, 95, 97; 307/83; 323/259, 323/261, 262
See application file for complete search history.

(56) References Cited

U.S. PATENT DOCUMENTS

| | | | | |
|---|---|---|---|---|
| 4,748,397 A * | 5/1988 | Ogawa et al. | ............... | 323/222 |
| 5,418,709 A * | 5/1995 | Lukemire | .................. | 323/222 |
| 6,034,514 A * | 3/2000 | Sakai | .......................... | 323/225 |
| 6,191,965 B1 * | 2/2001 | Matsumoto | .................. | 363/89 |
| 6,525,513 B1 * | 2/2003 | Zhao | .......................... | 323/222 |
| 7,116,087 B2 * | 10/2006 | Zhang et al. | ............... | 323/272 |
| 7,138,787 B2 * | 11/2006 | Tsuruya | ...................... | 323/225 |
| 7,183,754 B2 * | 2/2007 | Tsuruya | ..................... | 323/272 |
| 2005/0047175 A1 * | 3/2005 | Kawasaki et al. | ............ | 363/16 |
| 2006/0208712 A1 | 9/2006 | Tsuruya | | |
| 2006/0208713 A1 | 9/2006 | Tsuruya | | |

FOREIGN PATENT DOCUMENTS

JP    2003-304644    10/2003

* cited by examiner

*Primary Examiner*—Adolf Berhane
(74) *Attorney, Agent, or Firm*—Oblon, Spivak, McClelland, Maier & Neustadt, P.C.

(57) ABSTRACT

A DC/DC converter includes a first transformer and a second transformer each having primary windings and secondary windings respectively having first windings and second windings, a second switch connected to both ends of a first series circuit, a fourth switch connected to both ends of a second series circuit, a third series circuit being connected to both ends of the second switch and having the second winding and a second DC power supply, a fourth series circuit being connected to both ends of the fourth switch and having the second winding and the second DC power supply, a reactor connected to both ends of a series circuit having the secondary windings, and a control circuit turning ON/OFF the first and third switches with a phase difference of a half cycle and turning ON/OFF the second and fourth switches with a phase difference of a half cycle.

10 Claims, 7 Drawing Sheets

FIG. 8E

DC/DC CONVERTER

BACKGROUND OF THE INVENTION

The present invention relates to a DC/DC converter which has a high step-up/step-down ratio and operates in both directions by a regenerative operation or the like, and more particularly, to a miniaturization technique.

Recently, a 42V system and a 14V system are used as electric parts of automobiles. A DC power supply (first battery) of the 42V system is charged with power provided by a power generator, charges a DC power supply (second battery) of the 14V system through the DC/DC converter, and supplies power to electric parts of the 14V system. When the second battery has excessive electric power, the power is supplied to the first battery from the second battery through the DC/DC converter.

A DC/DC converter for the 14V system for driving the electric parts of the 42V system has high output current, and since the output current and current passing through a switching device are substantially the same, the switching device of high current is connected to the DC/DC converter in parallel.

Figure 1:
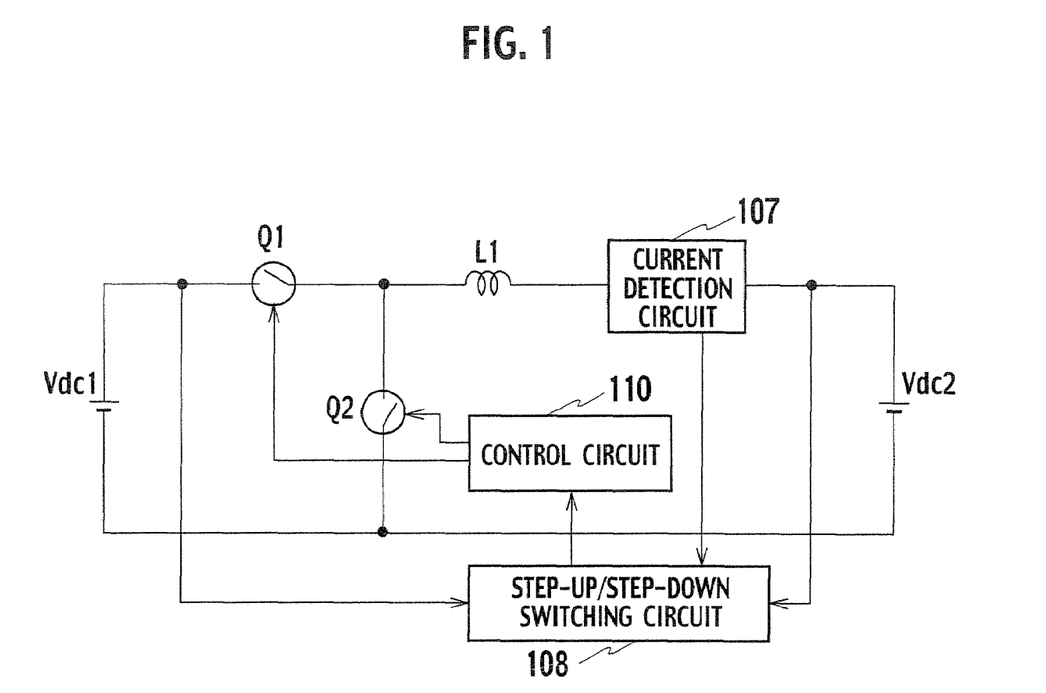
FIG. 1 is a circuit diagram of a conventional DC/DC converter.

FIG. 1 is a circuit diagram of a conventional DC/DC converter. The DC/DC converter shown in FIG. 1 has a DC power supply Vdc1 (e.g., 42V) as a first DC power supply and a DC power supply Vdc2 (e.g., 14V) as a second DC power supply. This DC/DC converter is a bidirectional converter that steps up and steps down voltage by supplying power in two directions between the DC power supply Vdc1 and the DC power supply Vdc2.

In FIG. 1, a series circuit having a switch Q1 including an MOSFET and a switch Q2 including an MOSFET is connected to both ends of the DC power supply Vdc1. A series circuit of a reactor L1, a current detection circuit 107, and the DC power supply Vdc2 is connected to both ends of the switch Q2.

The current detection circuit 107 detects current passing through a reactor L1, and outputs the current to a step-up/step-down switching circuit 108. The step-up/step-down switching circuit 108 detects voltage of the DC power supply Vdc1 and voltage of the DC power supply Vdc2, and outputs a switching signal for switching a step-up/step-down operation to a control circuit 110 according to the voltage of the DC power supply Vdc2, the voltage of the DC power supply Vdc1, and polarity of the current detected by the current detection circuit 107.

The control circuit 110 ON/OFF controls the switch Q1 and the switch Q2 based on a switching signal from the step-up/step-down switching circuit 108, thereby controlling the voltage step-down operation (control of charging) from the DC power supply Vdc1 to the DC power supply Vdc2, and controlling the voltage step-up operation (control of a discharging or regenerative operation) from the DC power supply Vdc2 to the DC power supply Vdc1.

An operation of the conventional DC/DC converter thus configured will be explained with reference to a timing chart of each signal at the time of a voltage step-down operation shown in FIG. 2 and a timing chart of each signal at the time of a voltage step-up operation shown in FIG. 3.

Figure 2:
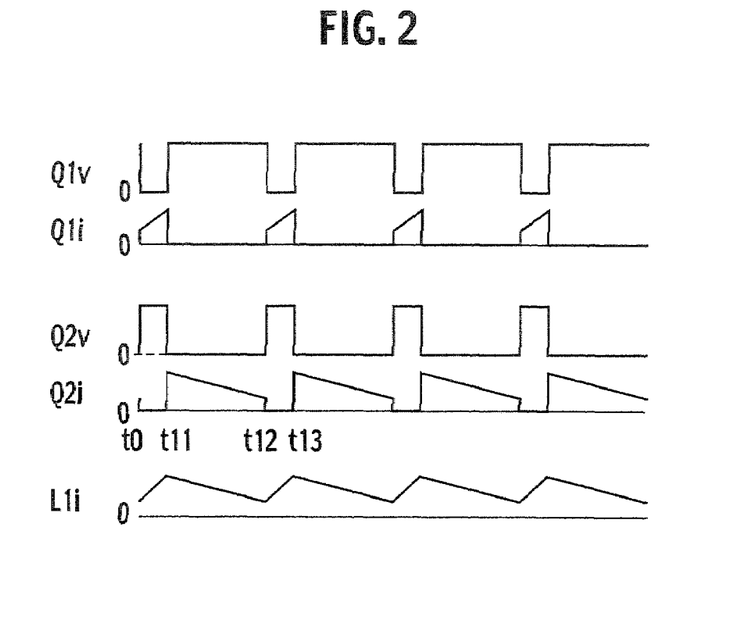
FIG. 2 is a timing chart of signals of various portions at the time of a voltage step-down operation of the conventional DC/DC converter.
Figure 3:
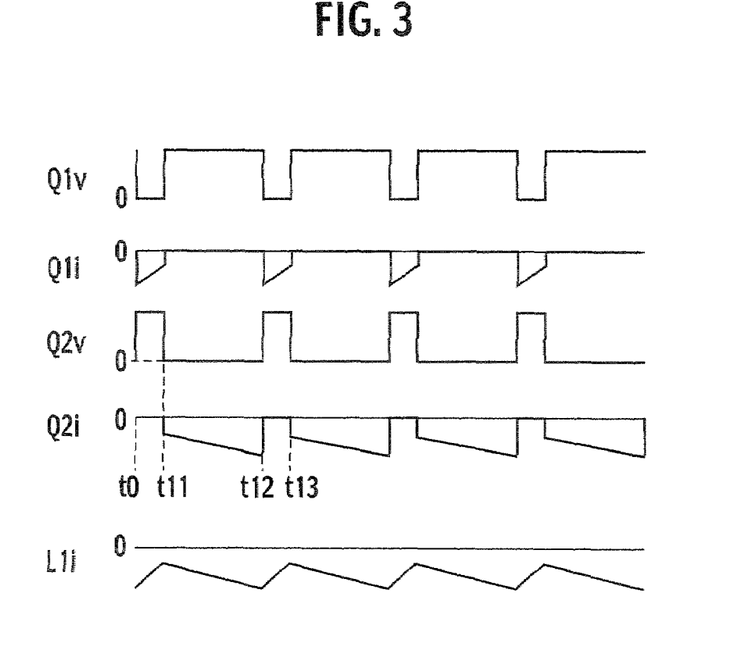
FIG. 3 is a timing chart of signals of various portions at the time of a voltage step-up operation of the conventional DC/DC converter.

In FIGS. 2 and 3, a reference symbol Q1v represents voltage between a drain and a source of the switch Q1, Q1i represents drain current of the switch Q1, Q2v represents voltage between a drain and a source of the switch Q2, Q2i represents drain current of the switch Q2, and L1i represents current passing through the reactor L1.

The operation at the time of voltage step-down operation shown in FIG. 2, that is, an operation for lowering voltage from 42V to 14V by supplying power of the DC power supply Vdc1 to the DC power supply Vdc2 will be explained. At time t0, if the switch Q2 is turned OFF and the switch Q1 is turned ON, current passes through a path extending along Vdc1 plus terminal, Q1, L1, Vdc2, and Vdc1 minus terminal, and the DC power supply Vdc2 is charged with power. Thus, the current Q1i of the switch Q1 is increased straightly with respect to time. At the same time, the current L1i of the reactor L1 is also increased straightly with respect to time.

In duration from time t11 to time t12, if the switch Q1 is turned OFF and the switch Q2 is turned ON, the current Q1i of the switch Q1 abruptly becomes a zero value, and the current Q2i of the switch Q2 abruptly increases to a given value and is then lowered straightly. At that time, current passes through a path extending along L1, Vdc2, Q2, and L1 by energy stored in the reactor L1. Therefore, the DC power supply Vdc2 is charged with electricity. The current L1i of the reactor L1 is also lowered from a peak value such as to draw an inclination corresponding to a difference value between input voltage and output voltage. The operation after time t12 is the same as that from time t0 to time t12. Current Q1i of the switch Q1, current Q2i of the switch Q2, and current L1i of the reactor L1 are in a positive direction.

An operation at the time of the voltage step-up operation shown in FIG. 3, that is, a voltage step-up operation from 14V to 42V (a regenerative operation) by supplying power of the DC power supply Vdc2 to the DC power supply Vdc1 will be explained. At time t11, if the switch Q1 is turned OFF and the switch Q2 is turned ON, current passes through a path extending along Vdc2 plus terminal, L1, Q2, and Vdc2 minus terminal. Thus, current Q2i of the switch Q2 increases straightly. At the same time, current L1i of the reactor L1 also increases straightly.

Induration of time t12 to time t13, if the switch Q2 is turned OFF and the switch Q1 is turned ON, current Q2i of the switch Q2 abruptly becomes a zero value, and the current Q1i of the switch Q1 abruptly increases to a given value and then is lowered straightly. At that time, current passes through a path extending along Vdc2 plus terminal, L1, Q1, Vdc1, and Vdc2 minus terminal by energy stored in the reactor L1, and, the DC power supply Vdc1 is charged with electricity. The current L1i of the reactor L1 is lowered. The operation after time t13 is the same as that from time t11 to time t13. Current Q1i of the switch Q1, current Q2i of the switch Q2, and current L1i of the reactor L1 are in a negative direction.

SUMMARY OF THE INVENTION

In the DC/DC converter shown in FIG. 1, however, the reactor L1 is increased in size. To miniaturize the reactor L1, it is necessary to increase the switching frequency of the switching device. If the switching frequency is increased, however, loss of the switching device is increased.

When a step-up/step-down ratio of the DC power supply Vdc1 and the DC power supply Vdc2 is high, a conduction angle of the switching device becomes narrow, and the switching device cannot be utilized effectively.

According to the present invention, it is possible to provide a small and efficient DC/DC converter having a high step-up/step-down ratio and bidirectional current.

According to a first technical aspect of the present invention, there is provided a DC/DC converter for supplying power in both directions between a first DC power supply and a second DC power supply, comprising: a first transformer having a primary winding including a first winding and a second winding and having a secondary winding; a second transformer having a primary winding including a first winding and a second winding and having a secondary winding; a second switch connected to both ends of a series circuit to which the first DC power supply, a first switch, and the first winding of the first transformer are serially connected; a fourth switch connected to both ends of a series circuit to which the first DC power supply, a third switch, and the first winding of the second transformer are serially connected; a first series circuit being connected to both ends of the second switch and including the second winding of the first transformer and the second DC power supply; a second series circuit being connected to both ends of the fourth switch and including the second winding of the second transformer and the second DC power supply; a reactor being connected to both ends of a series circuit to which the secondary winding of the first transformer and the secondary winding of the second transformer are serially connected; and a control circuit turning ON/OFF the first switch and the third switch with a phase difference of a half cycle, and turning ON/OFF the second switch and the fourth switch with a phase difference of the half cycle.

According to a second technical aspect of the invention, the DC-DC converter further characterized in that: a winding number np of the primary winding of the first transformer and a winding number np of the primary winding of the second transformer are equal to each other; a winding number np2 of the first winding of the first transformer and winding number np2 of the first winding of the second transformer are equal to each other; a winding number np1 of the second winding of the first transformer and a winding number np1 of the second winding of the second transformer are equal to each other; and the DC/DC converter has a predetermined winding number ratio A as expressed by A=np/np1=(np1+np2)/np1.

According to a third technical aspect of the invention, the DC/DC converter of the first aspect of the invention is characterized in that: the first transformer, the second transformer, and the reactor are an integrally formed magnetic circuit; the DC/DC converter includes a core being formed with a closed magnetic circuit and having a first leg, a second leg, and a third leg; each of the first leg, the second leg, and the third leg is a portion of the closed magnetic circuit; and the primary winding of the first transformer is wound around the first leg, the primary winding of the second transformer is wound around the second leg, and a gap is formed in the third leg.

According to a fourth technical aspect of the invention, the DC/DC converter of the first or the second aspect of the invention is characterized in that: the first transformer, the second transformer, and the reactor are an integrally formed magnetic circuit; the DC/DC converter includes a core being formed with a closed magnetic circuit and having a plurality of legs as portions of the closed magnetic circuit; a first coil including the primary winding of the first transformer and a second coil including the primary winding of the second transformer are wound around a first leg; and a magnetic shunt is formed between the first and the second coils.

According to a fifth technical aspect of the invention, the DC/DC converter of one of the first to the fourth aspect of the invention has a current detector (7) detecting current flowing between the first DC power supply and the second DC power supply, wherein the control circuit discriminates the polarity of current detected by the current detector to control the ON/OFF time of each of the first to the fourth switches.

BRIEF DESCRIPTION OF THE DRAWINGS

FIGS. 8A to 8E show magnetic circuits including a transformer and a reactor of the DC/DC converter of the present invention, in which

DESCRIPTION OF THE PREFERRED EMBODIMENTS

Embodiments of a DC/DC converter according to the present invention will be explained in detail with reference to the accompanying drawings.

In the DC/DC converter of the embodiment, two transformers are provided, converter outputs which are operated with 180° phase difference of the transformers are synthesized, and the frequency is increased by twice and added to the reactor, thereby miniaturizing the reactor as an energy storing device, and achieving a state of equilibrium of currents of the converters.

A primary winding of the transformer is provided with a tap, the primary winding is formed into a first winding and a second winding which are operated as an autotransformer, and a conduction ratio of a switching device (switch) is increased in a converter having high step-up/step-down ratio, thereby reducing the flowing current and reducing loss to miniaturize and enhance the efficiency of the converter. A magnetic circuit is devised and the transformer and the reactor are integrally formed to further miniaturize the circuit.

First Embodiment

Figure 4:
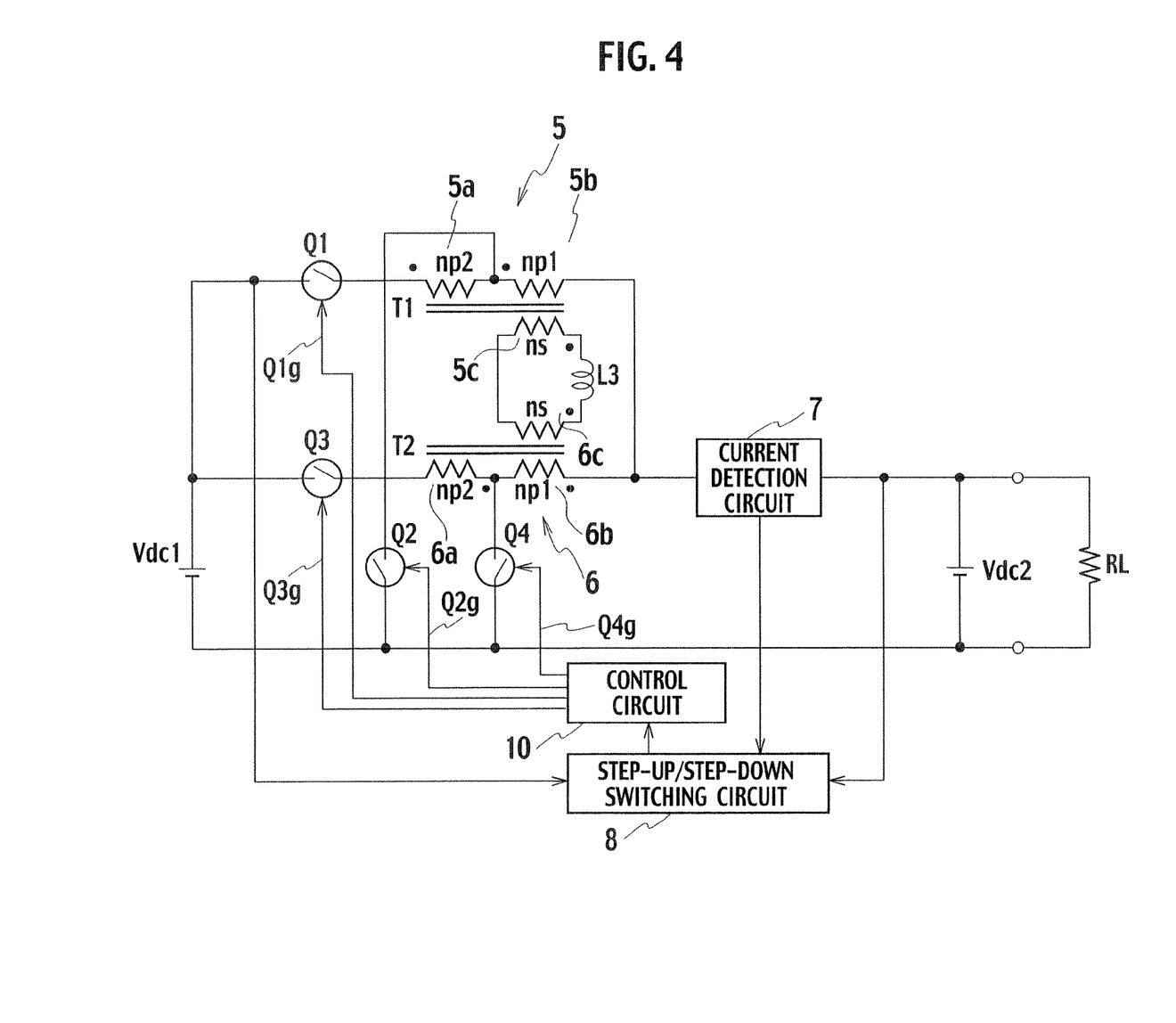
FIG. 4 is a circuit diagram of a DC/DC converter according to a first embodiment of the present invention.

FIG. 4 is a circuit diagram of a DC/DC converter according to a first embodiment. This DC/DC converter steps up and steps down voltage of a DC power supply. The DC/DC converter includes a DC power supply Vdc1 (first DC power supply), a DC power supply Vdc2 (second DC power supply), a transformer T1 (first transformer), a transformer T2 (second transformer), a switch Q1 (first switch), a switch Q2 (second switch), a switch Q3 (third switch), a switch Q4 (fourth switch), a reactor L3, a current detection circuit 7, a step-up/step-down switching circuit 8, and a control circuit 10.

The transformer T1 includes a primary winding 5 (winding number np=np1+np2) including a first winding 5a (winding number np2) and a second winding 5b (winding number np1) being serially connected to the first winding 5a, and a secondary winding 5c (winding number ns) which is electromagnetically connected to the first winding 5a and the second winding 5b. The transformer T2 has the same configuration as that of the transformer T1, and includes a primary winding 6 (winding number np=np1+np2) including a first winding 6a (winding number np2) and a second winding 6b (winding number np1) being serially connected to the first winding 6a, and a secondary winding 6c (winding number ns) which is electromagnetically connected to the first winding 6a and the second winding 6b.

The switch Q2 including an MOSFET and the like is connected in parallel to both ends of a series circuit in which the DC power supply Vdc1, the switch Q1 including an MOSFET and the like, and the first winding 5a of the transformer T1 are serially connected to each other. The switch Q4 including an MOSFET and the like is connected in parallel to both ends of a series circuit in which the DC power supply Vdc1, the switch Q3 including an MOSFET and the like, and the first winding 6a of the transformer T2 are serially connected to each other.

A series circuit including the second winding 5b of the transformer T1, the current detection circuit 7, and the DC power supply Vdc2 is connected to both ends of the switch Q2. A series circuit including the second winding 6b of the transformer T2, the current detection circuit 7, and the DC power supply Vdc2 is connected to both ends of the switch Q4. The reactor L3 is connected to both ends of a series circuit to which the secondary winding 5c of the transformer T1 and the secondary winding 6c of the transformer T2 are serially connected.

The current detection circuit 7 detects current passing through both the transformer T1 and the transformer T2, and outputs the detection value to the step-up/step-down switching circuit 8. The step-up/step-down switching circuit 8 detects voltage of the DC power supply Vdc1 and voltage of the DC power supply Vdc2, and outputs a switching signal for switching between a voltage step-up operation and a voltage step-down operation to the control circuit 10 according to the voltage of the DC power supply Vdc1, the voltage of the DC power supply Vdc2, and the polarity of the current detected by the current detection circuit 7.

The control circuit 10 turns the switch Q1 and the switch Q3 ON and OFF with a 180° phase difference and turns the switch Q2 and the switch Q4 ON and OFF with a 180° phase difference based on a switching signal from the step-up/step-down switching circuit 8, thereby controlling the voltage step-down operation (control of a charging operation) from the DC power supply Vdc1 to the DC power supply Vdc2, and controlling the voltage step-up operation (control of a discharging operation or regenerative operation) from the DC power supply Vdc2 to the DC power supply Vdc1.

A first converter is constituted with the switch Q1, the switch Q2, and the transformer T1 constitute, and a second converter is constituted with the switch Q3, the switch Q4, and the transformer T2. A load RL is connected to the DC power supply Vdc2 in parallel.

The operation of the DC/DC converter of the first embodiment with the above configuration will be explained with reference to a timing chart of each signal at the time of the voltage step-down operation shown in FIG. 5, and a timing chart of each signal at the time of the voltage step-up operation shown in FIG. 6.

Figure 5:
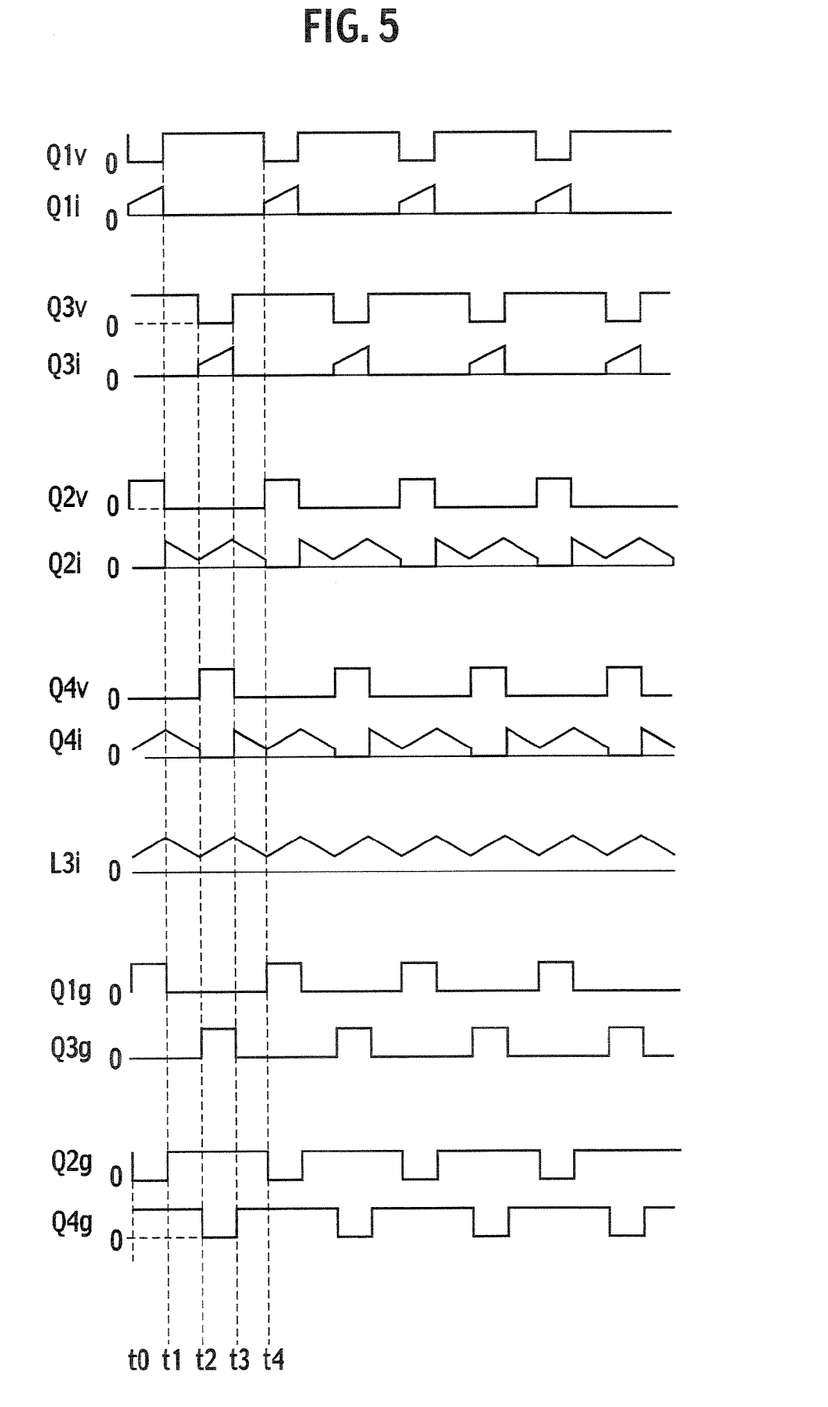
FIG. 5 is a timing chart of signals of various portions at the time of a voltage step-down operation of the DC/DC converter according to the first embodiment.
Figure 6:
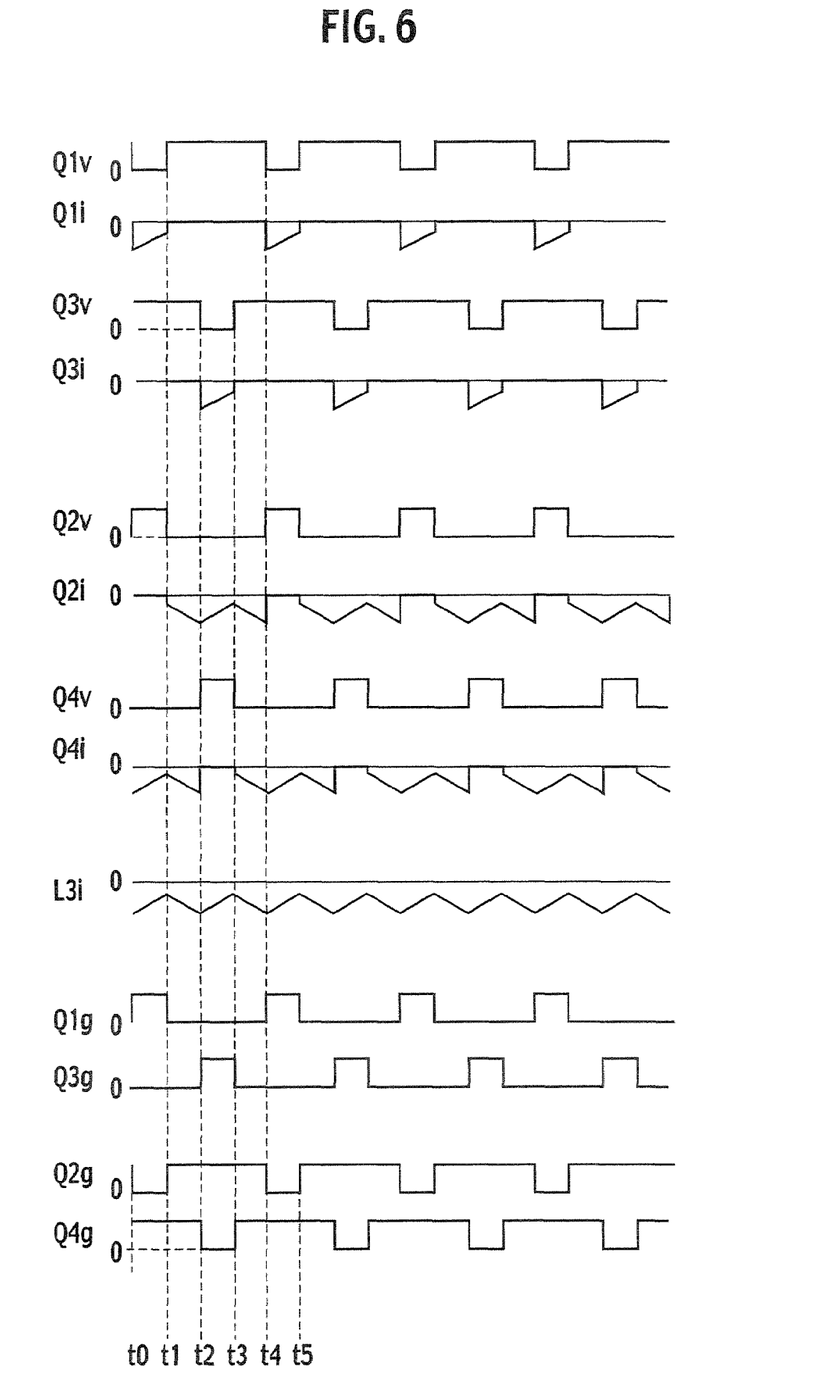
FIG. 6 is a timing chart of signals of various portions at the time of a voltage step-up operation of the DC/DC converter according to the first embodiment.

In FIGS. 5 and 6, a reference symbol Q1$v$ represents voltage between a drain and a source of the switch Q1, Q1$i$ represents drain current of the switch Q1, Q2$v$ represents voltage between a drain and a source of the switch Q2, Q2$i$ represents drain current of the switch Q2, Q3$v$ represents voltage between a drain and a source of the switch Q3, Q3$i$ represents drain current of the switch Q3, Q4$v$ represents voltage between a drain and a source of the switch Q4, Q4$i$ represents drain current of the switch Q4, L3$i$ represents current flowing to the reactor L3, Q1$g$ represents a signal applied to a gate of the switch Q1, Q2$g$ represents a signal applied to a gate of the switch Q2, Q3$g$ represents a signal applied to a gate of the switch Q3, and Q4$g$ represents a signal applied to a gate of the switch Q4.

The operation of supplying power of the DC power supply Vdc1 to the DC power supply Vdc2 to decrease voltage from 42V to 14V will be explained with reference to the voltage step-down operation as shown in FIG. 5. At time t0, that is, in an ON state of the switch Q4 and OFF states of the switches Q2 and Q3, if the switch Q1 is turned ON, current flows in a clockwise direction along a path extending along Vdc1 plus terminal, Q1, 5a, 5b, Vdc2, and Vdc1 minus terminal, and the DC power supply Vdc2 is charged with electricity. Therefore, the current Q1$i$ of the switch Q1 is increased straightly with respect to time. At the same time, voltage is generated also in the secondary winding 5c of the transformer T1, and current L3$i$ flows in a clockwise direction through a path extending along 5c, the reactor L3, 6c, and 5c.

The current L3$i$ flows by law of equal ampere-turns of the transformer and the like, energy is stored in the reactor L3, and the same current flows also through the secondary winding 6c of the transformer T2. Therefore, voltage corresponding to the winding number is induced in the primary winding 6 of the transformer T2.

Current flowing through the primary winding 6 of the transformer T2 is determined by the winding number np (=np1+np2) of the primary winding 6 and the winding number ns of the secondary winding 6c. If np=ns, the same current as the current Q1$i$ of the switch Q1 flows. With this current, current of the second winding 6b of the transformer T2, i.e. T2$np1i$=(ns/np1)·Q1$i$=(np/np1)·Q1$i$, passes through in a clockwise direction along a path extending along 6b, Vdc2, Q4, and 6b. Therefore, current Q4$i$ also increases straightly with respect to time. Thus, current (load current) flowing into the DC power supply Vdc2 becomes IL=Q1$i$+T2$np1i$ (=Q4$i$).

At time t1, that is, in an OFF state of the switch Q3 and in an ON state of the switch Q4, if the switch Q1 is turned OFF and the switch Q2 is turned ON, current T1$np1i$ of the second winding 5b of the transformer T1 having the same value as that of current T2$np1i$ flows through a path extending along 5b, Vdc2, Q2, and 5b in a clockwise direction caused by the current L3$i$ of the reactor L3. Therefore, current flowing through the DC power supply Vdc2 becomes T1$np1i$+T2$np1i$=2·Q1$i$·(np/np1). During from time t1 to time t2, current L3$i$ of the reactor L3, current T1$np1i$ (=Q2$i$) of the second winding 5b of the transformer T1, and current T2$np1i$ (=Q4$i$) of the second winding 6b of the transformer T2 are reduced straightly.

At time t2, that is, in an OFF state of the switch Q1 and an ON state of the switch Q2, if the switch Q4 is turned OFF and the switch Q3 is turned ON, current flows through a path extending along Vdc1 plus terminal, Q3, 6a, 6b, Vdc2, and Vdc1 minus terminal in a clockwise direction. Therefore, current Q3$i$ of the switch 03 is increased straightly. At the same time, voltage is generated also in the secondary winding 6$c$ of the transformer T2, and the current L3$i$ flows through a path extending along 6$c$, 5$c$, the reactor L3, and 6$c$ in a clockwise direction.

The current L3$i$ flows by law of equal ampere-turns of the transformer and the like, energy is stored in the reactor L3, and the same current flows also through the secondary winding 5$c$ of the transformer T1. Therefore, voltage corresponding to the winding number is induced in the primary winding 5 of the transformer T1.

Current flowing through the primary winding 5 of the transformer T1 is determined by the winding number np (=np1+np2) of the primary winding 5 and the winding number ns of the secondary winding 5$c$. If np=ns, the same current as the current Q3$i$ of the switch Q3 flows. With this current, current of the second winding 5$b$ of the transformer T1 i.e. T1$np1i$=(ns/np1)·Q3$i$=(np/np1)·Q3$i$ flows through a path extending along 5$b$, Vdc2, Q2, and 5$b$ in a clockwise direction. Therefore, current Q2$i$ also increases straightly. Thus, current (load current) flowing through the DC power supply Vdc2 becomes IL=Q3$i$+T1$np1i$(=Q2$i$).

At time t3, that is, in an OFF state of the switch Q1 and in an ON state of the switch Q2, if the switch Q3 is turned OFF and the switch Q4 is turned ON, current T2$np1i$ of the second winding 6$b$ of the transformer T2 having the same value as that of current T1$np1i$ flows through a path extending along 6$b$, Vdc2, Q4, and 6$b$ in a clockwise direction caused by the current L3$i$ of the reactor L3. Therefore, current flowing through the DC power supply Vdc2 becomes T1$np1i$+T2$np1i$=2·Q3$i$·(np/np1).

During from time t3 to time t4, current L3$i$ of the reactor L3, current T1$np1i$ (=Q2$i$) of the second winding 5$b$ of the transformer T1, and current T2$np1i$ (=Q4$i$) of the second winding 6$b$ of the transformer T2 are reduced straightly. The operation at time t4 is the same as that at time t0.

Since the switch Q1 and the switch Q3 are operated with a phase deviation of 180°, the reactor L3 is alternately excited. Therefore, the reactor L3 is operated with a frequency two times higher than the switching frequencies of the switch Q1 and the switch Q3, and the inductance of the reactor L3 can be reduced. The current of the reactor L3 is the same as that of the switch Q1 and is half current of the reactor L1 of the conventional DC/DC converter shown in FIG. 1, and the capacity of the reactor L3 is about quarter that of the reactor L1, therefore the converter can be miniaturized.

Currents flowing through the switch Q1 and the switch Q3 are determined by current of the reactor L3. Since the same transformers are used as the transformer T1 and the transformer T2, the currents are equal to each other, and they are forcibly balanced. Further, since the transformer T1 and the transformer T2 do not store energy, these transformers may be small, and the converter can be miniaturized as a whole. The switching frequency is the same as that of the conventional converter, and current becomes ½ or lower.

When the step-up/step-down ratio is high, since the ON time of the switch is extremely short, the output current IL is almost equal to 2·T1$np1i$ (=2·np/np1) by a tap position (connected position between the first windings 5$a$ and 6$a$ and the second windings 5$b$ and 6$b$) of the transformer T1 and the transformer T2, and current twice of np/np1 can be outputted.

When a relation of np/np1=2 (np1=np2) is satisfied, current of almost four times can be supplied to the load RL with respect to currents of the switch Q1 and the switch Q3.

In this case, ON time of the switch Q1 and the switch Q3 is substantially twice of np1=np (when there is no tap). Thus, if the winding number ratio A=np/np1 of the transformer T1 and the transformer T2 is set equal to or greater than 1 (A≧1), ON time of the switch Q1 and the switch Q3 of the DC/DC converter having a high step-up/step-down ratio can be optimized.

That is, if a winding number ratio A of the transformer T1 and a winding number ratio A of the transformer T2 are adjusted, the conduction angles of the switches Q1 and Q3 can be optimized, a small switching device can be used, loss can be reduced, efficiency is enhanced, and two currents of converters can be balanced.

An operation when power is regenerated to the DC power supply Vdc1 will be explained with reference to an operation at the time of a voltage step-up operation as shown in FIG. 6. When voltage of the DC power supply Vdc2 becomes higher than set voltage of the control circuit 10, the step-up/step-down switching circuit 8 outputs a switching signal for increasing voltage to the control circuit 10. The control circuit 10 varies on-duty of the switch Q1 (switch Q3) by a switching signal for increasing voltage. In other words, the ON period of the switch Q1 (switch Q3) is shortened, and the ON period of the switch Q2 (switch Q4) is increased.

During from time t1 to time t2 in FIG. 6 (switches Q1 and Q3 are OFF and switches Q2 and Q4 are ON), energy is stored in the reactor L3 from the DC power supply Vdc2.

At time t2 in FIG. 6, where the switch Q2 is in an OFF state and the switch Q2 is in an ON state, if the switch Q4 is turned OFF and the switch Q3 is turned ON, current flows in a counterclockwise direction through a path extending along Vdc2 plus terminal, 5$b$, Q2, and Vdc2 plus terminal.

Then, current is induced in the primary winding 6 of the transformer T2 by current of the reactor L3, current flows in a counterclockwise direction through a path extending along Vdc2 plus terminal, 6$b$, 6$a$, Q3, Vdc1, and Vdc2 minus terminal, and the DC power supply Vdc1 is charged. That is, during from time t2 to time t3 (switches Q1 and Q4 are OFF and the switches Q2 and Q3 are ON), energy stored in the reactor L3 is discharged to the DC power supply Vdc1 through the switch Q3, and the DC power supply Vdc1 is charged.

In the similar manner, during from time t3 to time t4 (switches Q1 and Q3 are OFF and the switches Q2 and Q4 are ON), energy is stored in the reactor L3 from the DC power supply Vdc2.

At time t0 (time t4), where the switch Q3 is in an OFF state and the switch Q4 is in an ON state of the switch Q4, if the switch Q2 is turned OFF and the switch Q1 is turned ON, current flows in a counterclockwise direction through a path extending along Vdc2 plus terminal, 6$b$, Q4, and Vdc2 minus terminal.

Current is induced in the primary winding 5 of the transformer T1 by current of the reactor L3, current flows in a counterclockwise direction through a path extending along Vdc2 plus terminal, 5$b$, 5$a$, Q1, Vdc1, and Vdc2 minus terminal, and the DC power supply Vdc1 is charged. That is, during from time t4 to time t5 (switches Q2 and Q3 are OFF and the switches Q1 and Q4 are ON), energy stored in the reactor L3 is discharged to the DC power supply Vdc1 through the switch Q1, and the DC power supply Vdc1 is charged.

In this case, power is supplied to the DC power supply Vdc1 from the DC power supply Vdc2, the direction of electricity conversion becomes opposite, and the regenerative operation is carried out.

When voltage of the DC power supply Vdc2 is extremely high, the regenerative electricity becomes high, ON time of the switch Q1 (switch Q3) becomes substantially zero, and the switch Q2 (switch Q4) is turned ON. Thus, current of the switch Q2 (switch Q4) is increased, and the switch Q2 (switch Q4) breaks down. To prevent breakage of the switch Q2 (switch Q4), it is necessary to shorten the ON period of the switch Q2 (switch Q4).

The operation at this time is reversed with respect to the normal operation (power is supplied from the DC power supply Vdc1 to the DC power supply Vdc2) in such that power is supplied from the DC power supply Vdc2 to the DC power supply Vdc1.

Therefore, if the current detection circuit 7 detects the polarity (direction) of current, the polarity of the current is negative (direction of current flowing from the DC power supply Vdc2 to the DC power supply Vdc1 is defined as negative). The step-up/step-down switching circuit 8 discriminates the polarity of current detected by the current detection circuit to output a switching signal for switching the step-up/step-down operation to the control circuit 10. The control circuit 10 is configured to control such as to lengthen the ON period of the switch Q1 (switch Q3) and to shorten the ON period of the switch Q2 (switch Q4).

Thus, since it is possible to prevent overcurrent from flowing to the switch Q2 (switch Q4), the switch Q2 (switch Q4) does not break down.

At the time of the regenerative operation, a switching signal for switching the step-up/step-down operation may be inputted to the control circuit 10 from outside.

Although the operation of the step-down converter is explained in the normal direction in the above description, if the step-up converter is in the normal direction, the regenerative operation in the above explanation becomes the normal direction, and similarly, control is performed based on the idea that the voltage step-down operation is the regenerative operation, and the operation is carried out in the same manner.

Second Embodiment

Figure 7:
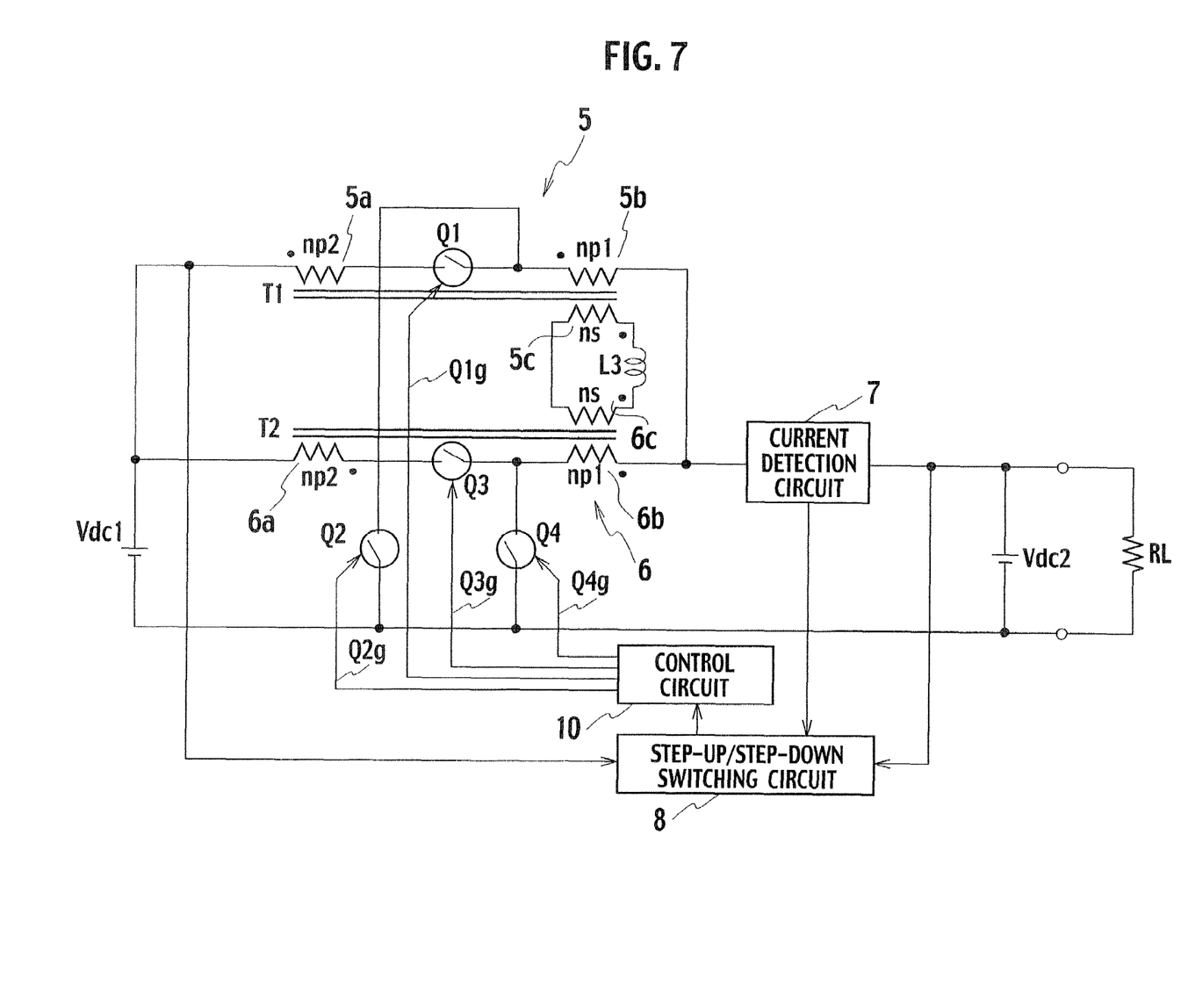
FIG. 7 is a circuit diagram of a DC/DC converter according to a second embodiment.

FIG. 7 is a circuit diagram of a DC/DC converter according to a second embodiment. The DC/DC converter shown in FIG. 7 is based on the DC/DC converter shown in FIG. 4, where the switch Q1 is connected between the first winding 5a and the second winding 5b of the transformer T1, and the switch Q2 is connected between the first winding 6a and the second winding 6b of the transformer T2.

The switch Q2 is connected to both ends of a series circuit to which the DC power supply Vdc1, the first winding 5a of the transformer T1, and the switch Q1 are serially connected. The switch Q4 is connected to both ends of a series circuit to which the DC power supply Vdc1, the first winding 6a of the transformer T2, and the switch Q3 are serially connected.

Since the operation of the DC/DC converter of the second embodiment having the above configuration is the same as that of the DC/DC converter shown in FIG. 4, the same effect can be obtained.

The switch Q1 and the switch Q2 are provided close to each other, and the switch Q3 and the switch Q4 are provided close to each other. Thus, the switch Q1 and the switch Q2 can be integrally formed together, and the switch Q3 and the switch Q4 can be also integrally formed together. With this, a magnetic circuit integrally provided with a transformer and a reactor can be formed as an IC and can be modularized.

Integration of Magnetic Circuit

FIGS. 8A to 8E show a magnetic circuit in which the transformers and the reactors of the DC/DC converters of the first and the second embodiments are integrally formed. FIGS. 8A to 8E show a technique for integrally forming the transformers and the reactors.

Figure 8A:
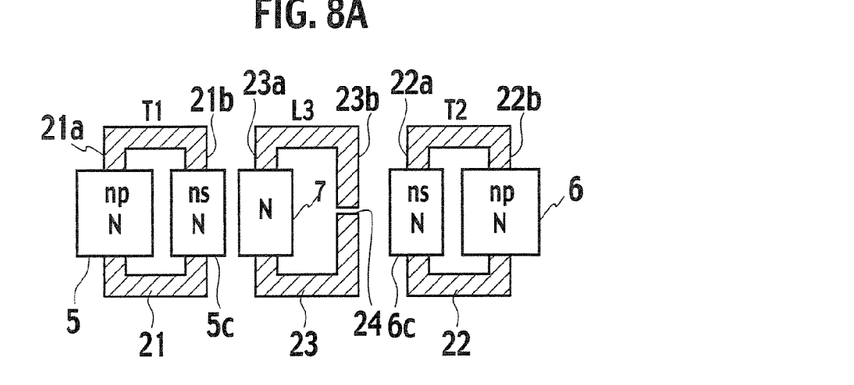
FIG. 8A shows the magnetic circuit of the embodiment of the invention.

As shown in FIG. 8A, according to the transformer T1 of the DC/DC converter of each of the first and the second embodiments, the primary winding 5 (winding number np) is wound around a first leg 21a of a core 21 made of a magnetic material formed with a closed magnetic circuit, and a secondary winding 5c is wound around a second leg 21b of the core 21. The transformer T2 is formed such that the primary winding 6 (winding number np) is wound around a first leg 22b of a core 22 formed with a closed magnetic circuit, and the secondary winding 6c is wound around a second leg 22a of the core 22. The reactor L3 is formed such that a winding 7 is wound around a first leg 23a of a core 23 including a gap. A gap 24 is formed in a second leg 23b of the core 23.

Figure 8B:
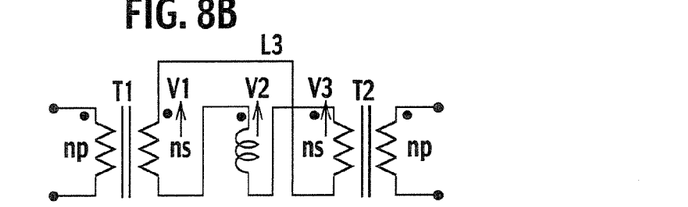
FIG. 8B shows electrical connection of the magnetic circuit.

The transformer T1, the transformer T2, and the reactor L3 are electrically connected as shown in FIG. 8B. With this configuration, if the cores of the transformer T1, the transformer T2, and the reactor L3 shown in FIG. 8A are integrally formed as shown in FIG. 5C, the operation does not change.

Figure 8C:
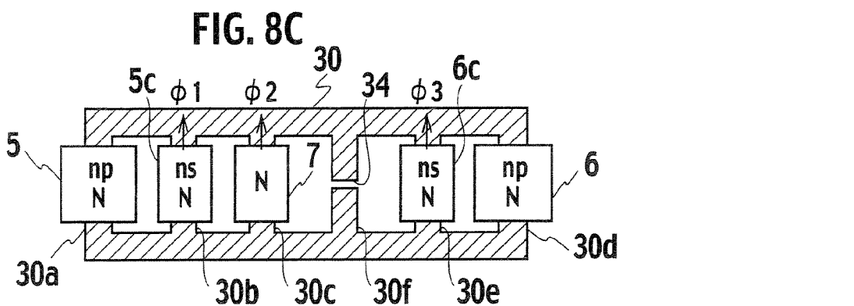
FIG. 8C shows a magnetic circuit integrally formed with a core.

According to the magnetic circuit shown in FIG. 8C, the primary winding 5 of the transformer T1 is wound around a first leg 30a of a core 30 formed with a closed magnetic circuit, the secondary winding 5c of the transformer T1 is wound around a second leg 30b, the winding 7 is wound around a third leg 30c, the primary winding 6 of the transformer T2 is wound around a fourth leg 30d, the secondary winding 6c of the transformer T2 is wound around a fifth leg 30e, and a gap 34 is formed in a sixth leg 30f. A magnetic flux penetrating the secondary winding 5c of the transformer T1 is $\Phi 1$, a magnetic flux penetrating the winding 7 of the reactor L3 is $\Phi 2$, and a magnetic flux penetrating the secondary winding 6c of the transformer T2 is $\Phi 3$.

Here, since the secondary winding 5c (winding number ns) of the transformer T1, the secondary winding 6c (winding number ns) of the transformer T2, and the reactor L3 are connected in a form of a ring (closed loop), if voltage of the secondary winding 5c of the transformer T1 is V1, voltage of the winding 7 of the reactor L3 is V2, and voltage of the secondary winding 6c of the transformer T2 is V3, a total sum of voltage generated in the windings 5C, 6c, and 7 is obtained as V1+V2+V3=0.

If the winding numbers of the windings 5c, 6c, and 7 are equal to one another and the winding number is defined as N, a magnetic flux $\Phi$ of a core around which the winding is wound is expressed by $d\Phi/dt=V$. Therefore, since a total sum of voltages of the windings is zero, a total sum of the magnetic flux variations of the cores is also zero. Thus, even if the magnetic circuit shown in FIG. 8A is replaced by the magnetic circuit shown in FIG. 8C, since the total sum of the magnetic flux is $\Phi 1+\Phi 2+\Phi 3=0$, the operation is not influenced.

Figure 8D:
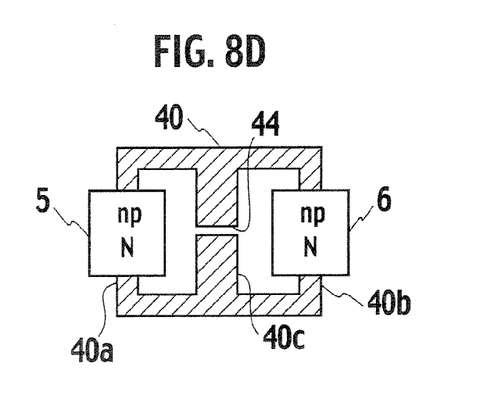
FIG. 8D shows a magnetic circuit which is equivalent to the former magnetic circuit.

Further, since $\Delta\Phi 1+\Delta\Phi 2+\Delta\Phi 3=0$ ($\Delta\Phi 1$, $\Delta\Phi 2$, and $\Delta\Phi 3$ represent variation in magnetic flux of $\Phi 1$, $\Phi 2$, and $\Phi 3$, respectively), even if all of the three legs, that is, the leg 30b through which the magnetic flux $\Phi 1$ passes, the leg 30c through which the magnetic flux $\Phi 2$ passes, and the leg 30e through which the magnetic flux $\Phi 3$ passes are removed to form a magnetic circuit as shown in FIG. 8D, the operation does not essentially changed. According to the magnetic circuit shown in FIG. 8D, the primary winding 5 of the transformer T1 is wound around a first leg 40a of a core 40 formed with a closed magnetic circuit, the primary winding 6 of the transformer T2 is wound around a second leg 40b, and a gap 44 is formed in a third leg 40c. With this, the magnetic circuit can be miniaturized.

If a core including the three legs is used in this manner, the two transformers and the reactor can be simplified, and the circuit configuration can be also simplified.

Figure 8E:
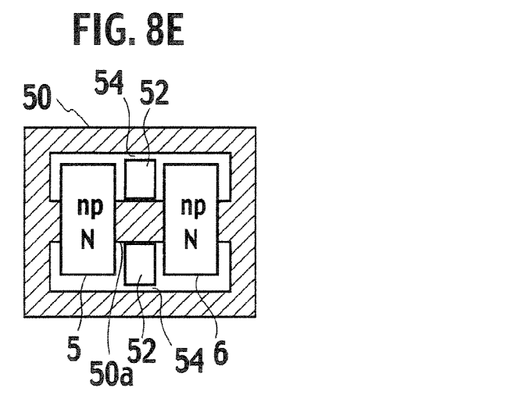
FIG. 8E shows another magnetic circuit which is equivalent to the former magnetic circuit.

As shown in FIG. 8E, a first coil including the primary winding 5 of the transformer T1 and a second coil including the primary winding 6 of the transformer T2 are wound around a central leg 50a of a core 50 formed with a closed magnetic circuit, and a magnetic shunt 52 made of a magnetic material is provided between these two coils. A gap 54 is formed between the magnetic shunt 52 and an outer leg of the core 50.

In the case of the magnetic circuit shown in FIG. 8E, since the coupling state between the first and the second coils is enhanced, and most of the magnetic flux generated by both the coils passes through the magnetic shunt 52, the inductance can be adjusted in a wide range by the gap 54 of the magnetic shunt 52. Therefore, if the gap 54 is increased in size according to a use application in which much peak current flows, the DC/DC converter can be used without saturating the core.

Effect of the Invention

According to the first technical aspect of the present invention, if the first switch is turned ON at the time of the voltage step-down operation, current flows to the second DC power supply through the primary winding of the first transformer, voltage is generated in the secondary winding of the first transformer, and energy is stored in the reactor. The energy stored in the reactor makes the primary winding of the second transformer generate voltage through the secondary winding of the second transformer, the current flows through a path extending along the second winding of the second transformer, the second DC power supply, the fourth switch, and the second winding of the second transformer, and the current returns to the second DC power supply. Next, if the third switch is turned ON, current flows to the second DC power supply through the primary winding of the second transformer, voltage is generated in the secondary winding of the second transformer, and energy is stored in the reactor. The energy stored in the reactor makes the primary winding of the first transformer generate voltage through the secondary winding of the first transformer, current flows through a path extending along the second winding of the first transformer, the second DC power supply, the second switch and the second winding of the first transformer, and the current returns to the second DC power supply.

If the second switch is turned ON and the third switch is also turned ON at the time of the voltage step-up operation, current flows through a path extending along the second DC power supply, the second winding of the first transformer, the second switch, and the second DC power supply, and energy stored in the reactor makes the primary winding of the second transformer generate voltage through the secondary winding of the second transformer, current flows through a path extending along the second DC power supply, the primary winding of the second transformer, the third switch, the first DC power supply, and the second DC power supply, and the first DC power supply is charged with electricity. Next, if the fourth switch and the first switch are turned ON, current flows through a path extending along the second DC power supply, the second winding of the second transformer, the fourth switch, and the second DC power supply, energy stored in the reactor makes the primary winding of the first transformer generate voltage through the secondary winding of the first transformer, current flows through a path extending along the second DC power supply, the primary winding of the first transformer, the first switch, the first DC power supply, and the second DC power supply, and the first DC power supply is charged with electricity.

That is, since the frequency of the reactor as the energy storing device can be increased by twice, the reactor can be miniaturized. Further, the currents of the two converters can be balanced.

According to the second technical aspect of the invention, by adjusting the winding number ratio of the transformer, it is possible to optimize the conduction angle of the switch, reduce current of the switch, use a small switching device, reduce loss, enhance the efficiency, and balance currents of the two converters.

According to the third technical aspect of the invention, since the first transformer, the second transformer, and the reactor are integrally formed by using the core having three legs, the circuit can be simplified, the converter can further be miniaturized and the efficiency can be enhanced.

According to the fourth technical aspect of the invention, since the coupling state between the first and the second coils is enhanced, and most of the magnetic flux generated by both the coils passes through the magnetic shunt, the inductance can be adjusted in a wide range by the gap of the magnetic shunt. Therefore, if the gap is increased in size according to a use application in which much peak current flows, the DC/DC converter can be used without saturating the core.

According to the fifth technical aspect of the invention, the current detector detects current flowing between the first and the second DC power supplies, and the control circuit discriminates the polarity of the current detected by the current detector. Since the ON/OFF time of each of the first to the fourth switches is controlled by the control circuit, it is possible to prevent overcurrent from flowing to the first to the fourth switches.

INDUSTRIAL APPLICABILITY

The present invention is applicable to a power supply circuit of a switching power supply apparatus such as a DC/DC converter and an AC/DC converter.

This application claims benefit of priority under 35USC §119 to Japanese Patent Applications No. 2005-244059, filed on Aug. 25, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC/DC converter for supplying power in both directions between a first DC power supply and a second DC power supply, comprising:

a first transformer having a primary winding including a first winding and a second winding and having a secondary winding;

a second transformer having a primary winding including a first winding and a second winding and having a secondary winding;

a second switch connected to both ends of a series circuit to which the first DC power supply, a first switch, and the first winding of the first transformer are serially connected;

a fourth switch connected to both ends of a series circuit to which the first DC power supply, a third switch, and the first winding of the second transformer are serially connected;

a first series circuit being connected to both ends of the second switch and including the second winding of the first transformer and the second DC power supply;

a second series circuit being connected to both ends of the fourth switch and including the second winding of the second transformer and the second DC power supply;

a reactor being connected to both ends of a series circuit to which the secondary winding of the first transformer and the secondary winding of the second transformer are serially connected; and a control circuit configured to turn ON/OFF the first switch and the third switch with a phase difference of a half cycle, turn ON/OFF the second switch and the fourth switch with a phase difference of the half cycle, and thereby supply power in both direction between the first DC power supply and the second DC power supply.

2. The DC/DC converter according to claim 1, wherein a winding number np of the primary winding of the first transformer and a winding number np of the primary winding of the second transformer are equal to each other;

a winding number np2 of the first winding of the first transformer and winding number np2 of the first winding of the second transformer are equal to each other;

a winding number np1 of the second winding of the first transformer and a winding number np1 of the second winding of the second transformer are equal to each other; and the DC/DC converter has a predetermined winding number ratio A as expressed by $A=np/np1=(np1+np2)/np1$.

3. The DC/DC converter according to claim 1, wherein the first transformer, the second transformer, and the reactor are an integrally formed magnetic circuit;

the DC/DC converter includes a core being formed with a closed magnetic circuit and having a first leg, a second leg, and a third leg;

each of the first leg, the second leg, and the third leg is a portion of the closed magnetic circuit; and the primary winding of the first transformer is wound around the first leg, the primary winding of the second transformer is wound around the second leg, and a gap is formed in the third leg.

4. The DC/DC converter according to claim 2, wherein the first transformer, the second transformer, and the reactor are an integrally formed magnetic circuit;

the DC/DC converter includes a core being formed with a closed magnetic circuit and having a first leg, a second leg, and a third leg;

each of the first leg, the second leg, and the third leg is a portion of the closed magnetic circuit; and the primary winding of the first transformer is wound around the first leg, the primary winding of the second transformer is wound around the second leg, and a gap is formed in the third leg.

5. The DC/DC converter according to claim 1, wherein the first transformer, the second transformer, and the reactor are an integrally formed magnetic circuit;

the DC/DC converter includes a core being formed with a closed magnetic circuit and having a plurality of legs as portions of the closed magnetic circuit;

a first coil including the primary winding of the first transformer and a second coil including the primary winding of the second transformer are wound around a first leg; and a magnetic shunt is formed between the first and the second coils.

6. The DC/DC converter according to claim 2, wherein the first transformer, the second transformer, and the reactor are an integrally formed magnetic circuit;

the DC/DC converter includes a core being formed with a closed magnetic circuit and having a plurality of legs as portions of the closed magnetic circuit;

a first coil including the primary winding of the first transformer and a second coil including the primary winding of the second transformer are wound around a first leg; and a magnetic shunt is formed between the first and the second coils.

7. The DC/DC converter according to claim 1, further comprising a current detector configured to detect current flowing between the first DC power supply and the second DC power supply, wherein the control circuit discriminates the polarity of current detected by the current detector to control the ON/OFF time of each of the first to the fourth switches.

8. The DC/DC converter according to claim 2, further comprising a current detector configured to detect current flowing between the first DC power supply and the second DC power supply, wherein the control circuit discriminates the polarity of current detected by the current detector to control the ON/OFF time of each of the first to the fourth switches.

9. The DC/DC converter according to claim 3, further comprising a current detector configured to detect current flowing between the first DC power supply and the second DC power supply, wherein the control circuit discriminates the polarity of current detected by the current detector to control the ON/OFF time of each of the first to the fourth switches.

10. The DC/DC converter according to claim 5, further comprising a current detector configured to detect current flowing between the first DC power supply and the second DC power supply, wherein the control circuit discriminates the polarity of current detected by the current detector to control the ON/OFF time of each of the first to the fourth switches.

* * * * *